UNITED STATES PATENT OFFICE.

FIRMAN THOMPSON, OF NEWARK, DELAWARE, ASSIGNOR TO THE CRESCENT CLAY REFINING COMPANY, OF BALTIMORE, MARYLAND, A CORPORATION OF MARYLAND.

PROCESS OF TREATING CLAY AND LIKE MATERIALS.

1,132,537.     Specification of Letters Patent.     Patented Mar. 16, 1915.

No Drawing.     Application filed August 23, 1913. Serial No. 786,290.

*To all whom it may concern:*

Be it known that I, FIRMAN THOMPSON, a citizen of the United States, residing at Newark, in the county of Newcastle and State of Delaware, have invented certain new and useful Improvements in Processes of Treating Clay and like Materials, of which the following is a specification.

This invention relates to the treatment of clay, bauxite, and other similar materials employed in the manufacture of pottery, paint, and paper and as a filler for cloth, and has particular reference to a novel process of removing iron from clay and similar materials to improve their quality and particularly their color, whereby they are rendered suitable, or more suitable, for the uses referred to.

Ferruginous clay and like materials are discolored by iron in the form of iron oxid. This iron may be removed by the action of strong acids, but such treatment, aside from the disadvantage of being prohibitively expensive, injuriously modifies the character of the clay, releasing a part or all of the combined water, and rendering the material to a greater or less extent, unfit for uses in connection with which it is most valuable. For many years attempts have been made by those skilled in the art to bleach ferruginous clay and the like without altering the character or composition thereof either by removing valuable constituents therefrom, setting free the combined water, increasing the proportion of the silica content or otherwise chemically decomposing or detrimentally affecting such material, but it has hitherto been impossible to effect such bleaching action without destroying or materially lessening the value of such materials for the uses above enumerated.

Now I have descovered that it is possible to purify ferruginous clays and like materials by the elimination of practically all of the iron therefrom without injuriously affecting the character of the material under treatment even as regards the combined water therein, by subjecting the same to the action of nascent hydrochloric acid, the gas being developed in contact with the clay or like materials under treatment and sufficient water to produce a dilute solution of the gas and washing out the resulting iron compound or compounds with water.

I have also discovered that some clays and other similar materials may be practically wholly freed from iron by subjecting the same to the action of a dilute solution of hydrochloric acid under heat and pressure, and washing out the resulting iron compound, without injury to the clay or the like.

In the practice of my process in its preferred form, considering for the purpose of illustration its application to clay, the clay is first mixed with weak brine, 100 pounds of clay being treated with brine produced by dissolving four pounds of sodium chlorid in 100 pounds of water. Seven pounds of sulfuric acid of 60° B. are then added and the mixture agitated by stirring or otherwise until a homogeneous paste results.

The mixture may be made in a digester or other chamber adapted to be hermetically sealed, or the materials may be brought together and the resulting paste run into the digester or like chamber. After being placed in the digester and sealed therein the mixture is subjected to the action of steam under a pressure of preferably 80 pounds to the square inch for from 10 minutes to an hour, depending upon the character of the clay under treatment, the steam being preferably passed through the mixture thereby agitating it and hastening the reaction.

The treatment with steam is ordinarily continued until a test sample of the clay removed and washed with water shows the practically complete absence of iron. After treatment with the steam has been completed the clay is washed with water, preferably in a filter press, and the clay, after being dried, is then ready for use.

In the treatment of clay containing approximately 1 per cent. of oxid or oxids of iron, by the process described, it is possible to effect the practically complete elimination of iron in 17 minutes and without changing the composition of the clay; even the content of combined water not being appreciably affected by the treatment.

It will be understood that different materials will require different strengths of reagents and different times of treatment with the steam under pressure and that for some uses the iron need be only partially removed, in which case the expense of the process or the time of operation or both will be materially lessened.

It is also to be understood that while I prefer to employ nascent hydrochloric acid as described, practical success may in some cases be obtained by the use of hydrochloric acid in dilute solution. Where hydrochloric acid in solution is used I preferably employ the gas in the same strength of solution which is produced in the practice of my process as hereinbefore set forth.

It is further to be understood that various changes may be made in the details of procedure, time of operation and strength of reagents employed and that equivalents of the reagents may be resorted to, all without departure from the spirit of my invention or the scope of the subjoined claims.

Having described my invention, I claim:

1. The process of treating clay and like materials to remove iron therefrom without decreasing the plasticity of the clay or the like, which consists in subjecting the same to the action of dilute hydrochloric acid under heat and pressure and removing the resulting iron compound or compounds produced.

2. The process of treating clay and like materials to remove iron therefrom without detrimental action on such materials, which consists in subjecting the same to the action of dilute hydrochloric acid and steam under pressure and removing the resulting iron compound or compounds produced.

3. The process of treating clay and like materials to remove iron therefrom without decreasing the plasticity of the clay or the like, which consists in developing nascent hydrochloric acid in contact therewith and sufficient water to produce a dilute solution of the acid, subjecting the material under treatment to the action of the solution under heat and pressure and removing the resulting iron compound or compounds produced.

4. The process of treating clay and like materials to remove iron therefrom without detrimental action upon such materials, which consists in developing nascent hydrochloric acid in contact therewith and sufficient water to produce a dilute solution of the acid, subjecting the material under treatment to the action of the solution and steam under pressure and removing the resulting iron compound or compounds produced.

5. The process of treating clay and like materials to remove iron therefrom without decreasing the plasticity of the clay or the like, which consists in treating the same with an alkali metal chlorid, an acid and sufficient water to produce a dilute solution of acid and chlorid, subjecting the mixture to heat and pressure and removing the iron compound or compounds produced.

6. The process of treating clay and like materials to remove iron therefrom without injury to the clay or the like, which consists in treating the same with an alkali metal chlorid, an acid and sufficient water to produce a dilute solution of acid and chlorid, subjecting the mixture to the action of steam under pressure and removing the iron compound or compounds produced.

7. The process of treating clay and like materials to remove iron therefrom without decreasing the plasticity of the clay or the like, which consists in treating the same with sodium chlorid, sulfuric acid and sufficient water to produce a dilute solution of acid and chlorid, subjecting the mixture to the action of heat and pressure and removing the iron compound or compounds produced.

8. The process of treating clay and like materials to remove iron therefrom without injury to the clay or the like, which consists in treating the same with sodium chlorid, sulfuric acid and sufficient water to produce a dilute solution of acid and chlorid, subjecting the mixture to the action of steam under pressure and removing the iron compound or compounds produced.

9. The process of treating clay and like materials to remove iron therefrom without decreasing the plasticity of the clay or the like, comprising treating the same with sodium chlorid and sulfuric acid in approximately the proportions of 7 parts by weight of the acid of 60° B. and 4 parts by weight of sodium chlorid and water, subjecting the mixture to the action of heat and pressure and removing the iron compound or compounds produced.

10. The process of treating clay and like materials to remove iron therefrom without injury to the clay or the like, comprising treating the same with sodium chlorid and sulfuric acid in approximately the proportions of 7 parts by weight of the acid of 60° B. and 4 parts by weight of sodium chlorid and water, subjecting the mixture to the action of steam under pressure and removing the iron compound or compounds produced.

11. The process of treating clay, and like materials to remove iron therefrom without injury to the clay or the like, comprising treating the same with sodium chlorid and sulfuric acid in dilute solution in approximately the proportions of 7 parts by weight of the acid of 60° B., 4 parts by weight of sodium chlorid, 100 parts by weight of water and 100 parts by weight of the clay or the like, subjecting the mixture to the action of steam under pressure and washing out the resulting iron compound or compounds with water.

In testimony whereof I affix my signature in presence of two witnesses.

FIRMAN THOMPSON.

Witnesses:
Z. H. TRAGER,
H. H. MORGAN, Jr.